United States Patent [19]

Lu

[11] Patent Number: 4,560,075

[45] Date of Patent: Dec. 24, 1985

[54] VACUUM FLASK CONSTRUCTION

[76] Inventor: Fu-San Lu, No. 80, La. 2, Sec. 1, An Her Rd., Tainan, Taiwan

[21] Appl. No.: 618,623

[22] Filed: Jun. 8, 1984

[51] Int. Cl.⁴ .............................................. B65D 6/10
[52] U.S. Cl. ................................... 215/13 R; 220/424
[58] Field of Search ............. 215/13 R; 220/400, 408, 220/410, 423, 424

[56] References Cited

U.S. PATENT DOCUMENTS 2,643,021  6/1953  Freedman ........................... 220/424
2,818,990  1/1958  Sommerfeld ....................... 215/13 R
3,048,294  8/1962  Osborn et al. ..................... 215/13 R
3,225,954  12/1965 Herrick et al. ................. 220/424 X
3,828,960  8/1974  Walles ............................... 215/13 R Primary Examiner—Donald F. Norton
Attorney, Agent, or Firm—Townsend and Townsend

[57] ABSTRACT

A vacuum flask made from a molded plastic container and a molded plastic jacket which are sealingly and threadedly coupled together to define a vacuum space, the outer side of the wall of the container and the inner side of the jacket being provided with thin metal coating layers respectively.

2 Claims, 1 Drawing Figure

VACUUM FLASK CONSTRUCTION

BACKGROUND OF THE INVENTION

This invention relates to a vacuum flask, particularly to an improved construction of a vacuum flask in which the flask is made of a non-fragile material.

It is known in the art to provide a vacuum flask which is made of glass for accomodating and insulating hot or cold liquid. Although such vacuum flask offers effective protection for hot or cold liquid, it is not durable due to the fragile characteristics of the glass. There are also plastic bottles which include foamed plastic insulating material for keeping the water warm. Such bottles are not as effective as the glass vacuum flask.

SUMMARY OF THE INVENTION

An object of the invention is to provide an improved vacuum flask construction which is durable and able to provide excellent protection for hot or cold liquid.

The foregoing and other effects can be achieved in accordance with the invention through the provision of a vacuum flask which comprises a container made of molded plastic material having a first screw thread formation at the outer rim of its open end, and a jacket disposed around the wall of said container. The jacket includes an upper portion and a lower portion which are sealingly and threadedly coupled together. The upper portion has an inwardly and downwardly curved rim which is provided with a second thread formation in a sealing engagement with said first thread formation. The wall of the container and the jacket defines a space in which there is a vacuum. There are further provided thin metal layers superimposed on the inner side of the jacket and on the outer side of the wall of the container respectively.

In one aspect of the invention, there is further provided a gloss coating on the thin metal layer for preventing the peeling of the metal layer.

The presently exemplary preferred embodiment will be described with reference to the accompanying drawings, in which:

DETAILED DESCRIPTION OF THE PREFERRED EMBODIMENT

Figure 1:
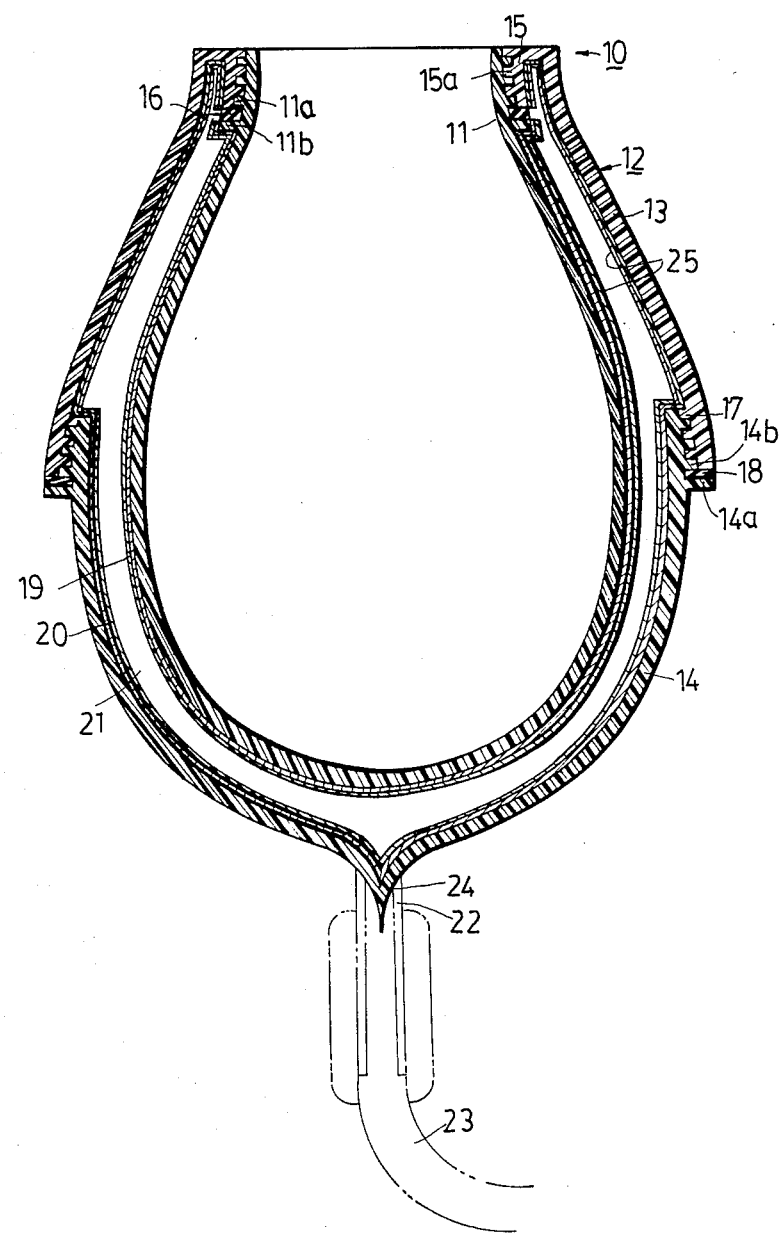
FIG. 1 is a schematic sectioned view of a vacuum flask constructed according to the invention.

As shown in FIG. 1, there is shown a vacuum flask 10 having an inner container 11 which is made of a molded plastic material and is provided with a screw formation 11a at the outer rim near its open end. Below the end of the screw formation 11a is provided a flange 11b and a sealing ring 16 on the flange 11b.

There is further provided a jacket 12 which covers the wall of the container 11 and has the same configuration as the container 11. The jacket 12 includes an upper cover member 13 and a lower cover memer 14. The upper cover member 13 is provided with an inwardly curved rim 15 which is extended inward from the top end of the upper member 13 to some extent and is then turned downward, the downwardly turned portion having a screw formation 15a which is in engagement with the screw formation 11a. The sealing ring 16 offers a sealing effect for the screw joint of the container 11 and the upper cover memer 13.

At the top portion of the lower member 14 is further provided a flange 14a and a screw formation 14b which is in engagement with screw formation 17 provided at the bottom portion of the upper member 13 in a fluid tight sealing relationship resulted from the provision of a sealing ring 18.

There are further provided thin metal layers 19 and 20 superimposed on the outer side of the wall of the container 11 and the inner side of the jacket 12 respectively by a known process, such as electroplating or vacuum metalizing. However, it is not essential to provide both thin metal layers 19 and 20, only one layers 19 or 20 is also acceptable.

There is further provided protective coatings 25 on the thin metal layers 19 and 20 for preventing the peeling of the metal layers. The coatings 25 also improve the fluid tight sealing for the space 21.

Preferably, the container 11 is made from polycarbonate plastic. The jacket 12 may be made from ABS or other plastics. It can be appreciated that the container 11 and the jacket 12 can be assembled just by screw couplings. Since the sealing rings 16 and 18 are provided at the screw joint, the space 21 defined by the wall of the container 11 and the jacket 12 is in a fluid tight position. At the lower side of the lower cover member 14 is provided a tube formation 11. A vacuum is developed in the space 21 by connecting the tube formation 22 to a vacuum pump (not shown) through a conduit 23, followed by vacuumizing. After vacuumizing, the tube formation 32 is cut out and then closed by heat treatment, thus forming a tapered closed end 24.

Since polycarbonate is a transparent material characterized by its non-toxicity, its odorless and high temperature resistance, it will not cause undesirable effects to the hot drinking water. The thin metal layers 19 and 20 are used for the purpose of preventing the transfer of heat by radiation. It can be appreciated that the vacuum flask constructed according to the invention is more durable than the conventional glass vacuum flask.

With the invention thus explained, it is apparent that obvious modifications and variations can be made without departing from the scope of the invention. It is therefore intended that the invention be limited only as indicated in the appended claims.

I claim:

1. A vacuum flask comprising: a container made of molded plastic material having a first screw thread formation at the outer rim of its open end, a jacket disposed around the wall of said container, the jacket including an upper portion and a lower portion which are sealingly and threadedly coupled together, the upper portion having an inwardly and downwardly curved rim which is provided with a second thread formation in a sealing engagement with said first thread formation, the wall of the container and the jacket defining a vacuumized space, and a thin metal layer being superimposed on the inner side of the jacket or on the outer side of the wall of the container respectively.

2. A vacuum flask as claimed in claim 1, further comprising a protective coating on said thin metal layer.

* * * * *